(12) United States Patent
Weber et al.

(10) Patent No.: US 8,286,764 B2
(45) Date of Patent: Oct. 16, 2012

(54) ROTATIONAL DAMPER

(75) Inventors: Wilfried Weber, Schlopfloch (DE); Jochen Heimsch, Fellbach (DE)

(73) Assignee: Dieter Holzle Technik-Projekte GmbH, Deckenpfronn (DE)

(*) Notice: Subject to any disclaimer, the term of this patent is extended or adjusted under 35 U.S.C. 154(b) by 620 days.

(21) Appl. No.: 12/515,053

(22) PCT Filed: Nov. 7, 2007

(86) PCT No.: PCT/DE2007/001996
§ 371 (c)(1),
(2), (4) Date: May 15, 2009

(87) PCT Pub. No.: WO2008/058510
PCT Pub. Date: May 22, 2008

(65) Prior Publication Data
US 2010/0051399 A1   Mar. 4, 2010

(30) Foreign Application Priority Data
Nov. 17, 2006   (DE) ...................... 20 2006 017 587 U (51) Int. Cl.
  *F16D 55/02* (2006.01)
(52) U.S. Cl. ............................ 188/294; 188/290; 188/83
(58) Field of Classification Search ................. 188/82.1, 188/83, 290, 293, 294, 295, 296
  See application file for complete search history.

(56) References Cited

U.S. PATENT DOCUMENTS

| 4,796,733 A | 1/1989 | Nakayama |
| 5,269,397 A | 12/1993 | Kawamoto et al. |
| 5,301,775 A | 4/1994 | Nedbal et al. |
| 5,862,896 A * | 1/1999 | Villbrandt et al. ............ 188/293 |
| 5,944,152 A | 8/1999 | Lindsay et al. |
| 2002/0043127 A1 | 4/2002 | Takahashi |

FOREIGN PATENT DOCUMENTS

| DE | 516627 C | 1/1931 |
| DE | 38 44 544 A1 | 12/1989 |
| JP | 63067437 A * | 3/1988 |
| WO | 96/13674 A1 | 5/1996 |

* cited by examiner

*Primary Examiner* — Thomas J Williams
(74) *Attorney, Agent, or Firm* — Browdy and Neimark, PLLC

(57) ABSTRACT

A rotational damper having a stator and a rotor that is rotatably supported in the stator, the rotor having a first friction element (31, 31 A ... 31 F), wherein the volume between the stator and the rotor is filled with a viscous fluid. According to the invention, the rotor has a second friction element (32, 32A ... 32F), which is supported coaxially in relation to the first friction element and rotationally coupled thereto, and which can be axially displaced relative to the first friction element. Due to the two-piece design of the friction element and the ability for axial displacement of the two friction elements, the entire effective surface of the friction element in the viscous fluid, and thus the frictional resistance and the damping characteristics of the rotational damper, can be varied. For this purpose, the second friction element preferably has a plurality of segments (5, 5A ... 5F), which immerse into the first friction element and can be displaced by an actuator (4, 4A ... 4G). These segments bring about the rotational coupling of the two friction elements. In this manner, continuous adjustment of the damping torque can occur across a broad range using a simple mechanism, in order to meet the diverse requirements in terms of size and type of rotational damping in various applications, using only one model.

13 Claims, 7 Drawing Sheets

ROTATIONAL DAMPER

TECHNICAL BACKGROUND

The invention relates to a rotational damper comprising a stator and a rotor that is rotatably supported in the stator, the rotor having a first friction element, wherein the volume between the stator and the rotor is filled with a viscous fluid.

Depending on the geometric design of the rotor and the viscosity of the fluid, when the rotor is acted upon by an external torque a resistance torque becomes effective that inhibits the rotation of the rotor and steadies and slows the external motion that is coupled to it.

Rotational dampers of this kind have many applications in the entire technical field, wherever, for example for safety reasons or comfort reasons, an otherwise abrupt motion is to be smoothed and slowed.

PRIOR ART

The large number of applications for such rotational dampers, of course, necessitates different designs of the damping effect based on the desired application; this, as a rule, necessitates the adaptation of the individual components, in particular of the rotor and of its interaction with the viscous fluid.

A rotational damper of the generic type is known from DE 42 07 757; the rotor is designed in the form of a rotary component with two vanes, whose rotation in the viscous fluid brings about the desired damping of the torque that is introduced from outside via a toothed wheel.

DE 10 2004 032 172 A1 shows a rotational damper in which a change in the damping behavior is attained by varying the working chamber volume by means of a movable defining wall. This rotational damper has a relatively large physical volume, so that there are many fields of application for which it cannot be utilized. Also, it requires metal components, which stands in the way of a simple and cost-effective production that is particularly important in these fields.

DE 38 44 544 A1 shows a rotary vane-type shock absorber in which the damping effect is adjustable through the dimensioning of a gap through which the viscous fluid is moved from a first chamber into a second chamber; the damping of a jolt—i.e. a pulse-like motion of limited duration—can thereby be adjusted to a certain degree; the rotational angle needs to remain limited to values below 360 degrees. This device is accordingly not usable for motion sequences that require continuous damping.

DE 516 627 shows a damping element that is based on a different damping principle, namely through displacement of two pistons that are axially movable on a common shaft and are turned relative to one another via this shaft, wherein the "resistance medium" may be either springs or also a viscous liquid. This device preferably serves as a shock absorber in motor vehicles and is likewise not suitable for motion sequences that require continuous damping.

WO 95/10728 shows a friction element whose rotor is axially adjustable relative to the stator by means of an adjusting screw; the damping effect in this case again is created by the rotation of the stator relative to the rotor. This damping element is preferably intended for use in TV or video applications for protection against blurring or distortions in pan and tilt movements (equivalent to DE 4 497 719 C2).

JP 09060678 A shows a damping element for a wide variety of applications in which the stator and the rotor are displaceable relative to one another in a medium by means of an adjusting shaft, and the damping effect is intended to be adjusted in this manner.

DE 100 34 393 C2 uses a similar principle as the above-mentioned DE 516 627, namely the creation of a friction effect and, hence, damping effect by means of the displacement of a piston; this device is designed as a seat belt retractor.

FR 714 099 shows a complexly designed damping device that also is based on the axial displacement of a piston-like component and that is adjustable in many different ways and serves as a shock absorber for motor vehicles. With this device, only a limited angle of rotation can be covered, it is designed similar to the above-mentioned DE 516 627; a ball serves as the damping valve creating a damping only in one direction.

EP 1 245 465 A1 also shows a belt retractor, based on the same principle as the above-mentioned DE 100 34 393 C2.

JP 05288234 A, lastly, again discloses a solution in which a damping is brought about through initiation of a back and forth movement of a piston that is turned in an internal thread of a housing when acted upon by means of an external force.

DISCLOSURE OF THE INVENTION

The invention has as its object to improve a rotational damper according to the type of the first-mentioned DE 42 07 757, in such a way that a continuous adjustment of the damping torque can occur across a broad range using simple means, in order to meet the demands placed on the rotational damping in various applications, using only one model.

This object is met according to the invention in such a way that the rotor has a second friction element that is supported coaxially relative to the first friction element and rotationally coupled thereto, and that can be axially displaced relative to the first friction element.

The underlying concept of the invention thus consists of designing a friction element as known from the prior art with a two-piece design, and varying through the ability for axial displacement of the two friction elements the total effective surface of the friction element in the viscous fluid, and thereby the frictional resistance and damping characteristics of the rotational damper.

For this purpose the second friction element preferably has a plurality of segments that immerse into the first friction element and that can be displaced by means of an adjusting element. These segments bring about the rotational coupling of the two friction elements.

The relative axial displacement of the two friction elements and thereby the adjustment of the damping characteristics is accomplished by an adjusting element that can be operated from outside, preferably an adjusting shaft that acts via a threaded connection on one of the friction elements and displaces it relative to the respective other friction element, thereby making the resistance surface of the friction element in the viscous liquid adjustable.

Additional embodiments of the invention are specified in the subclaims.

BRIEF DESCRIPTION OF THE DRAWINGS

Multiple exemplary embodiments of the invention will be explained in detail based on drawings, in which.

DESCRIPTION OF THE EXEMPLARY EMBODIMENTS

The exemplary embodiments that will be described below show a rotational damper comprising a two-piece stator and a rotor 3 revolving inside the stator, the rotor consisting of two friction elements 31,32 that are axially displaceable relative to each other and whose relative positioning and hence the damping of the rotational damper, is adjustable by means of an externally accessible adjusting element 4.

The stator in all exemplary embodiments consists of two stator parts 1 and 2, wherein the first stator part 1 is connected by means of the flange, which is shown wing-like, to an external component, for example a housing wall, and is designed substantially pot-shaped. The second stator part 2 is placed onto the first stator part 1 like a lid.

In the first stator part 1, a first friction element 31 is rotationally supported, whose exterior cross section corresponds approximately to the interior cross section of the first stator part 1. The internal volume of the stator 1,2 is filled with a viscous liquid in a known manner, so that a rotation of the first friction element 31 in the first stator part 1 produces a damping that is determined by the fit and shaping between the first friction element 31 and the stator part 1. This may be regarded as a kind of "basic damping", which is denoted in FIG. 14 with F31. To this extent the design of the rotational damper largely corresponds to the prior art.

In accordance with the invention, a second friction element is rotationally supported within the stator coaxially to the first friction element 31, the second friction element having segments 5 that are insertable into largely complementary recesses in the first friction element 31 up to a definable depth X, for which purpose the second friction element 32 is supported axially displaceable relative to the first friction element 31. By selecting the depth X by which the segments 5 of the second friction element 32 can immerse into the substantially complementary recesses of the first friction element, the damping F (FIG. 14) can be varied by a damping value F32.

This means that a damping characteristic curve of the rotational damper can be attained that is variable from a minimal damping (F31 at X=0) to a maximal damping (F31+F32 at $X=X_{max}$) and that can accordingly be adapted to the application at hand.

To adjust the depth X, the two friction elements 31 and 32 are axially displaceable by means of an externally accessible adjusting element 4, so that by using a suitable adjusting tool for the adjusting element 4, the depth X and, hence, the total damping F=F31+F32 can be adjusted in a simple manner.

The axial displacement of the two friction elements 31 and 32 within the stator is brought about in all exemplary embodiments by means of a threaded connection between the adjusting shaft and a matching thread of the first or second friction element.

In the shown exemplary embodiments, the section of the first friction element 31 that projects out from the stator is fixedly connected to a toothed wheel 6 that meshes with a toothed rack 7. In this special application, the above-described rotational damper thus serves for the damping of a linear movement of the toothed rack 7 or of a component (not depicted) that is connected to this toothed rack 7. Naturally, the inventive rotational damper may be used also without these components if an external torque is applied onto the first friction element 31 externally to the stator.

Adjusting of the depth X via the adjusting element 4 by means of an adjusting tool may, in principle, take place here from one (or also from both) of the two end faces of the adjusting element 4 via engagement of an adjusting tool, such as a screw driver, an Allen wrench, or a special tool.

The exemplary embodiments differ in their constructive design of these components; the constructive design can be adapted to the desired field of application of the rotational damper:

First Exemplary Embodiment

In the first exemplary embodiment (FIGS. 1 through 7) the adjusting element 4 is an adjusting shaft 4A that is supported with one of its ends in the first friction element 31A and that carries on its other end in a displaceable manner the second friction element 32A, which in turn is supported in a corresponding opening of the second stator part 2A. These two components are radially fixedly connected to each other by an external thread of the adjusting shaft 4A and a corresponding internal thread of the second friction element 32A, and they jointly rotate in the stator.

At the end face projecting out from second stator part 2A, the adjusting shaft 4A is provided with an adjusting opening 41A into which an Allen wrench can be inserted, with which the relative axial positioning of the adjusting shaft 4A and the second friction element 32A can be varied, with the effect that the substantially toothed-wheel-like segments 5A immerse more or less deeply into the corresponding recesses of the first friction element 31A.

FIGS. 1 through 5 show a first operating position of the rotational damper with minimal rotational damping. In this operating position the second friction element 32A takes its deepest position in the first friction element 31A, the overall rotational damping accordingly corresponds to the value F=F31 shown in FIG. 14, whose value is determined by the damping of the first friction element 31A in the rotor part 1A.

Figure 1:
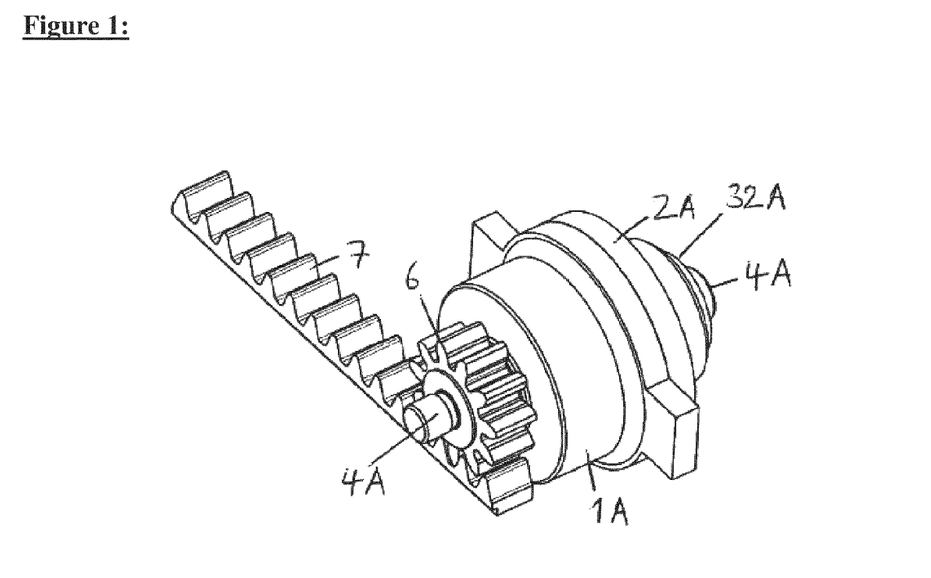
FIG. 1 shows a first perspective view of a first exemplary embodiment of a rotational damper comprising a rack-and-pinion drive.
Figure 2:
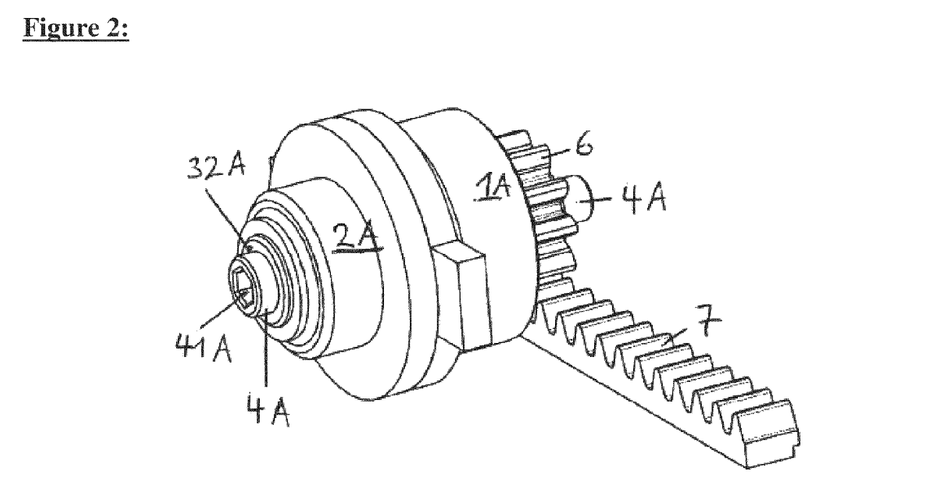
FIG. 2 shows a second perspective view of the rotational damper of FIG. 1.
Figures 3, 4:
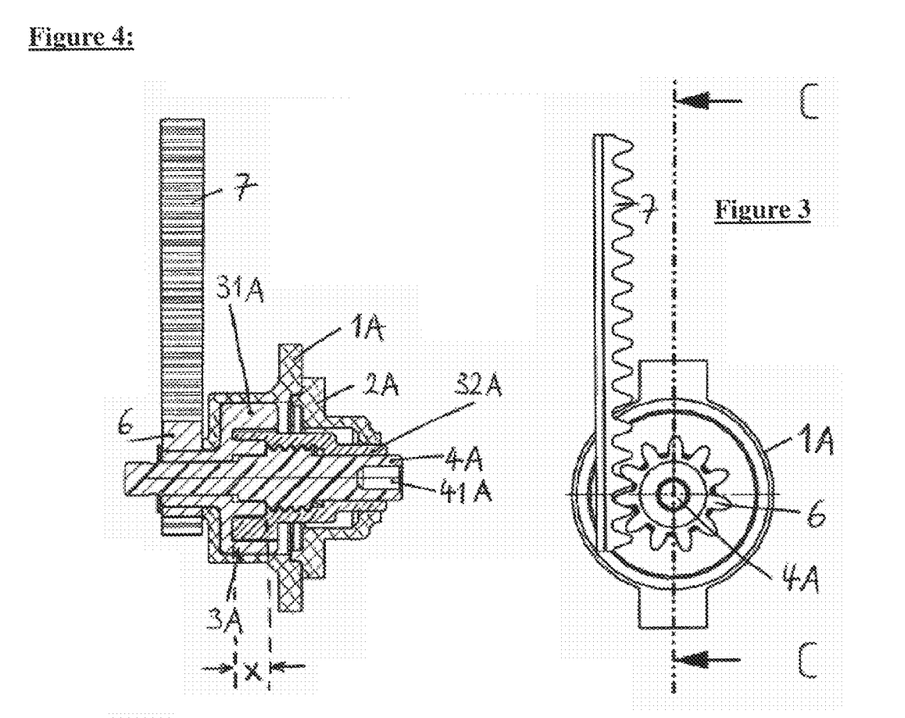
FIG. 3 shows a side view of the rotational damper of FIGS. 1 and 2.
FIG. 4 shows a first sectional view of the rotational damper according to FIGS. 1 and 2 in the plane C-C of FIG. 3 in a first operating position.
Figure 5:
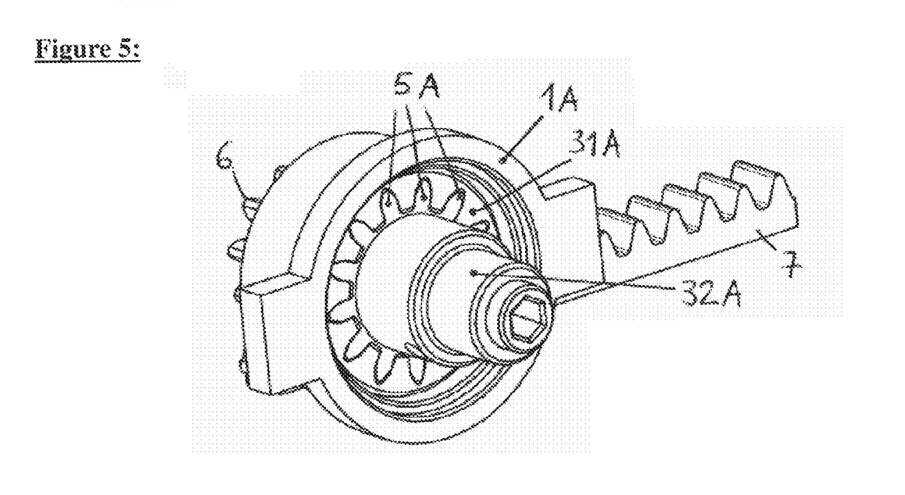
FIG. 5 shows a perspective illustration of the rotational damper according to FIG. 4 without stator cover.
Figure 6:
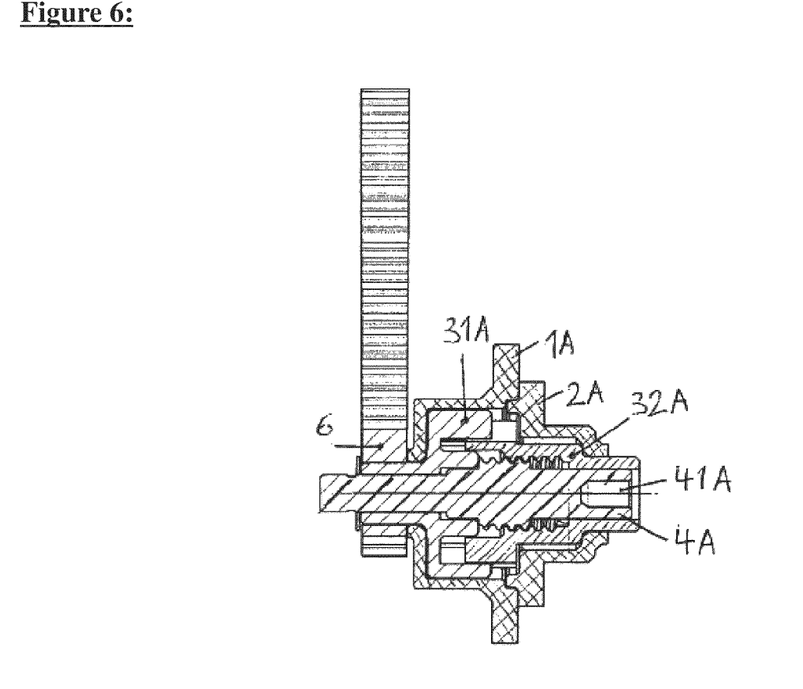
FIG. 6 shows a second sectional view of the rotational damper according to FIGS. 1 and 2 in the plane C-C of FIG. 3 in a second operating position.
Figure 7:
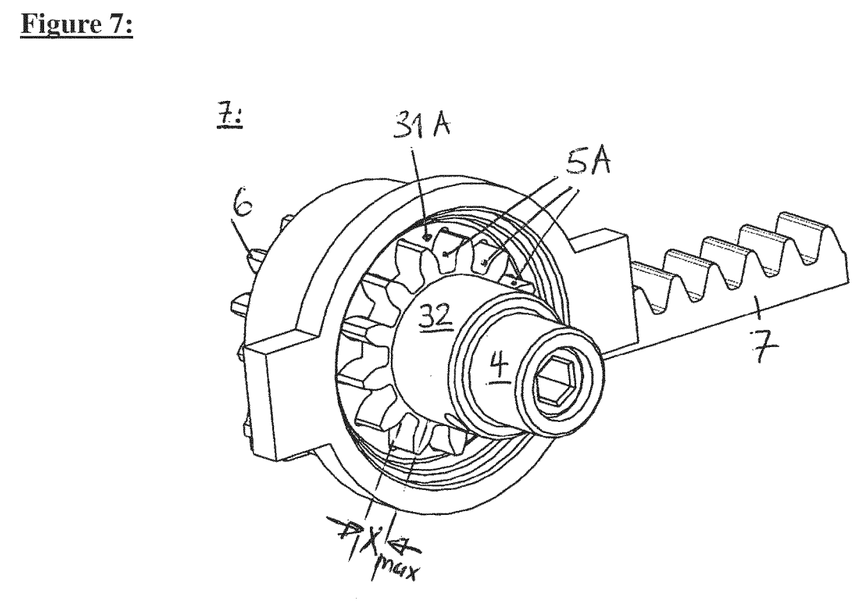
FIG. 7 shows a perspective illustration of the rotational damper according to FIG. 6 without stator cover.

In the second operating position of the rotational damper according to the first exemplary embodiment, depicted in FIGS. 6 and 7, the second friction element 32A was moved via a turning of the adjusting shaft 4A into a second operating position that corresponds to an end position in which a peripheral outer shoulder of the second friction element 32A comes to a stop against an inner shoulder of the second stator part 2A. In this end position the segments 5A are pulled out of "their" recesses in the first friction element 31A by their maximal depth $X_{max}$, thereby resulting in the greatest possible rotational damping $F_{max}$=F31+F32$_{max}$.

Second Exemplary Embodiment

Figure 8:
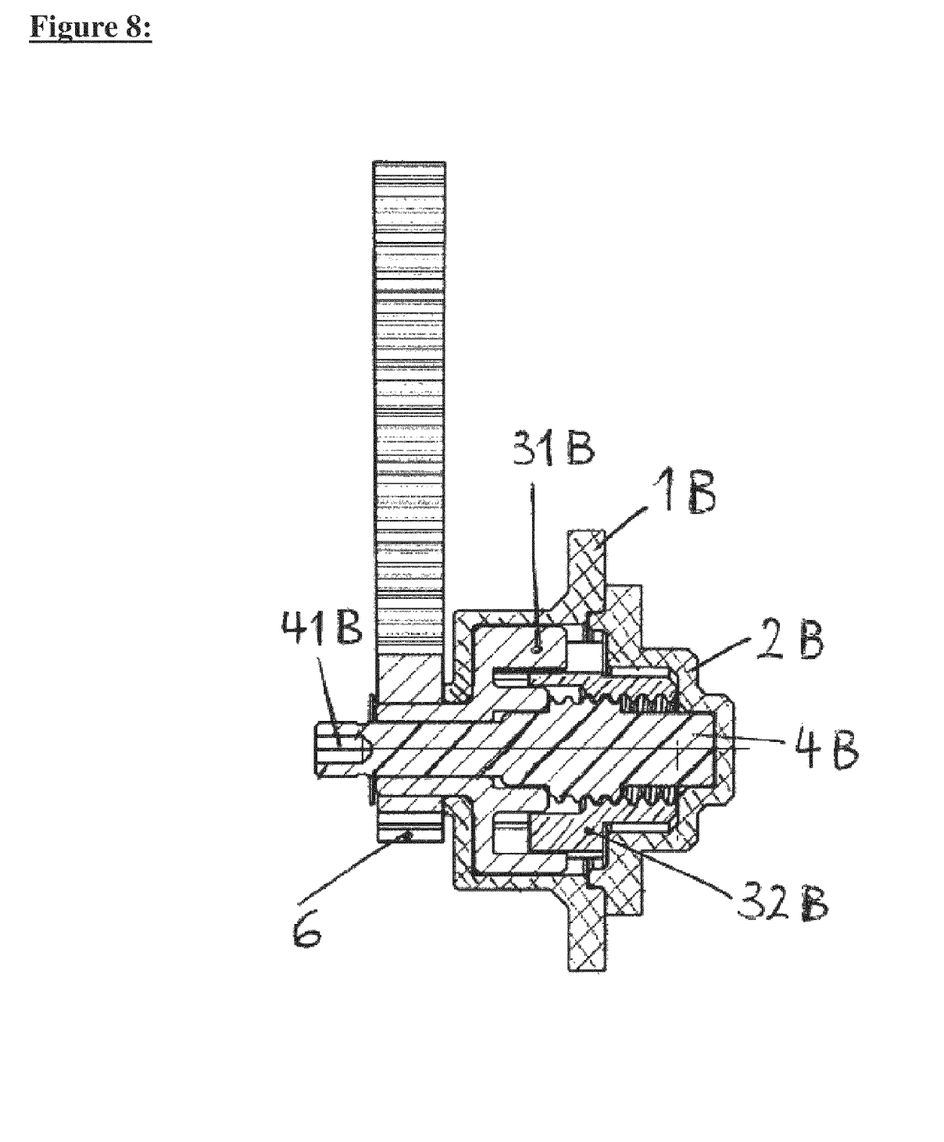
FIG. 8 shows a sectional view of a second exemplary embodiment of a rotational damper.

In the second exemplary embodiment (FIG. 8), the second stator part 2B is designed as a closed cap, so that the adjusting opening 41B is situated on the other side of the rotational damper that carries the toothed wheel 6. The adjustment of the axial position between the first friction element 31B and the second friction element 32B by means of the adjusting shaft 4B therefore takes place from this side, in other respects the mode of functioning corresponds to that of the described first exemplary embodiment; FIG. 8 shows (analogous to FIGS. 6 and 7 in the first exemplary embodiment) the operating position in which the maximal rotational damping $F_{max}$=F31+F32$_{max}$ is set, here the inner annular shoulder of the second stator component 2B forms an end stop for the end face of the second friction element 32B.

Third Exemplary Embodiment

In the third exemplary embodiment (FIG. 9) the second stator part 2C is again open and accommodates the rearward portion of the second friction element 32C.

Figure 9:
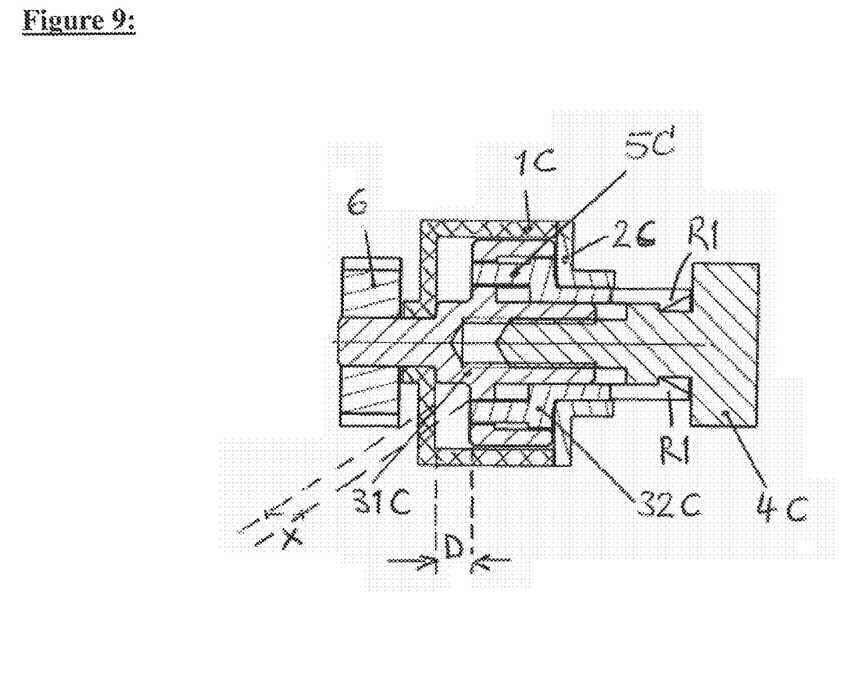
FIG. 9 shows a sectional view of a third exemplary embodiment of a rotational damper.

In this variant the adjusting shaft 4C is connected via an external thread to a corresponding internal thread of the first friction element 31C and axially coupled via a snap-type connection by means of a locking hook R1 to the second friction element 32C.

The first friction element 31C is provided with cutouts for the segments 5C of the second friction element 32C and held by means of a peripheral shoulder on one hand and the toothed wheel 6 on the other hand axially immobile inside the stator at a distance D to the face wall of the first stator part 1C, so that a turning of the adjusting shaft 4C leads to the relative displacement between the two friction elements 31C,32C, as a result of which the immersion depth X of the segments 5C and, hence, the damping characteristic curve, is variable. In the operating position shown in the exemplary embodiment, D=X.

Here, the adjusting shaft 4C is designed to be operated directly by hand, so that no adjusting opening is provided.

Figure 10:
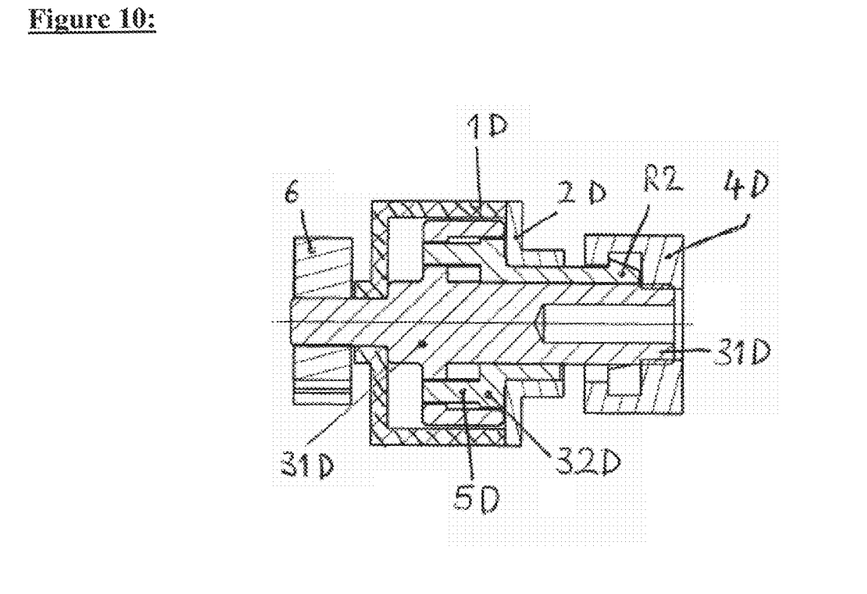
FIG. 10 shows a sectional view of a fourth exemplary embodiment of a rotational damper.

Fourth Exemplary Embodiment (FIG. 10)

In the fourth exemplary embodiment, the first friction element 31D also extends through the rotation opening of the stator part 2D; the adjusting element 4 takes the form of an adjusting nut 4D that is on one hand axially fixedly coupled via locking projections R2 to the second friction element 32D, and on the other hand connected via an internal thread to an external thread of the first friction element 31D, so that a turning of the adjusting nut 4D effects a pulling out or pushing in of the second friction element 32D with its segments 5D through the first friction element 31D into the volume between the first stator part 1D and the first friction element 31D. In the depicted position the setting is thus for minimal rotational damping.

Figure 11:
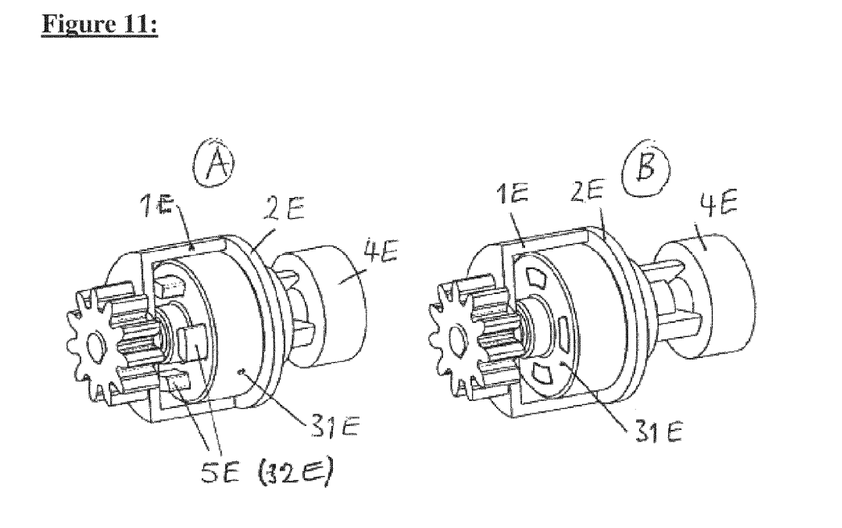
FIG. 11 shows a perspective view of a fifth exemplary embodiment of a rotational damper in two operating positions.

Fifth Exemplary Embodiment (FIG. 11)

In this exemplary embodiment, a variant of the segments 5E is shown that bring about, in the first operating position A, the maximal rotational damping and, at their "retracted" position B, the minimal rotational damping. The adjusting shaft 4E is assigned here to the two friction elements 31E,32E in such a way that its displacement or turning causes the displacement of the segments 31E.

Sixth Exemplary Embodiment

Figure 14:
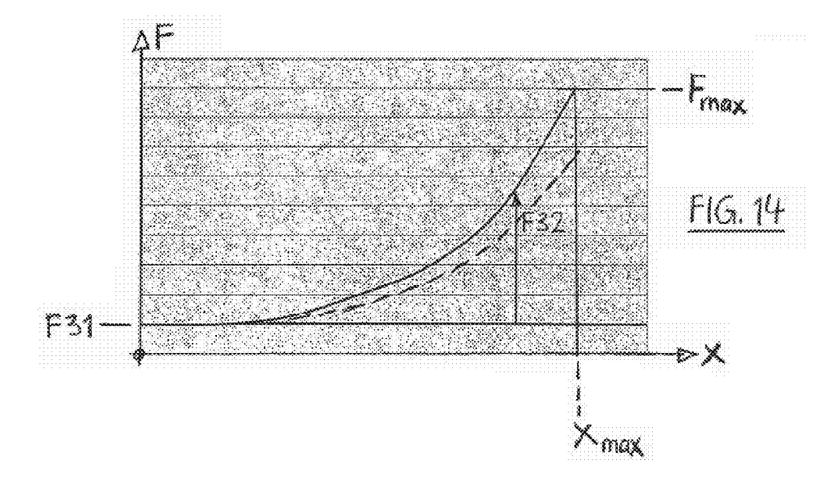
FIG. 14 shows an illustration of the damping characteristics of a rotational damper according to the exemplary embodiments.

The sixth exemplary embodiment (FIG. 12) corresponds in its basic design to the fifth exemplary embodiment of FIG. 11, however, the segments 5F are chosen with respect to their cross section such that their flow resistance in the viscous fluid varies according to the direction of rotation, which is illustrated in FIG. 14 by a second (dashed) characteristic curve:

At a rotation in the clockwise direction the flow resistance is lower (due to the indicated streamline shape of the segments 5F; dashed characteristic curve in FIG. 14) than at a rotation in the counter-clockwise direction (continuous characteristic curve in FIG. 14).

Figure 12:
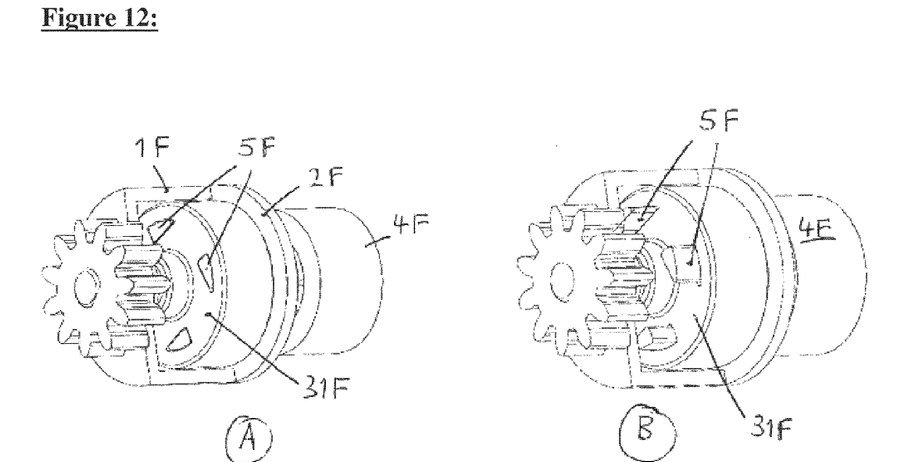
FIG. 12 shows a perspective view of a sixth exemplary embodiment of a rotational damper in two operating positions.
Figure 13:
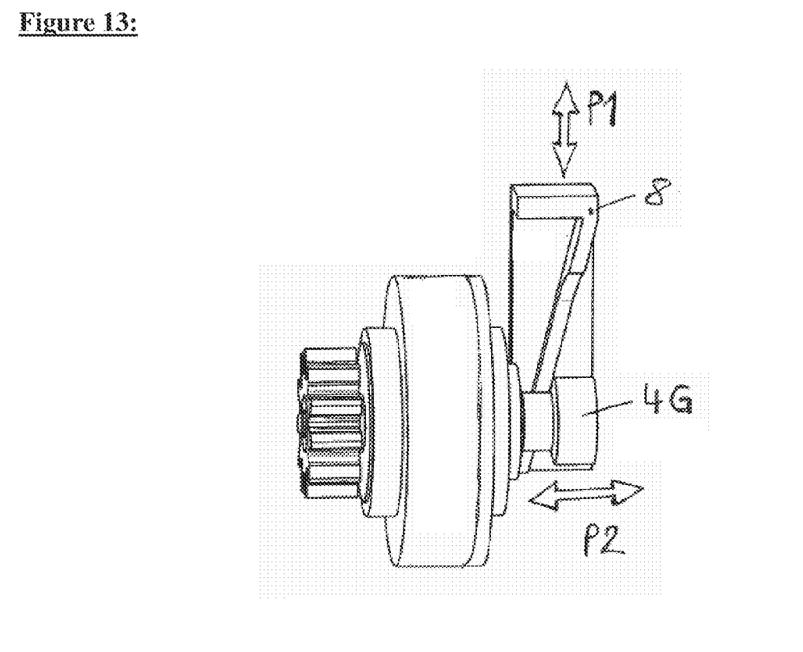
FIG. 13 shows a perspective view of a rotational damper according to FIG. 11 or 12 with an adjusting tool.

Proceeding from the design of the fifth and sixth exemplary embodiment of FIGS. 11 and 12, FIG. 13 lastly shows a special tool 8 that permits, via a shifting over an inclined plane, when moved in the direction of the arrow P1, a corresponding axial displacement of the adjusting shaft 4G in the direction of the arrow P2 and hence an adjustment of the damping characteristics.

REFERENCE NUMERALS stator 1, 1A . . . 1F
2, 2A . . . 2F
first friction element 31,31A . . . 31F
second friction element 32,32A . . . 32F
adjusting element 4, 4A . . . 4G
adjusting opening 41,41A,41B
segments 5, 5A . . . 5F
toothed wheel 6
toothed rack 7
tool 8

What is claimed is:

1. A rotational damper comprising a stator (1,2) and a rotor that is rotatably supported in the stator, the rotor having a first friction element (31), wherein the volume between the stator (1A,2A) and the rotor is filled with a viscous fluid, characterized in that the rotor has a second friction element (32) that is supported coaxially in relation to the first friction element (31) and rotationally coupled thereto, and that can be axially displaced relative to the first friction element; wherein said damper further comprises an adjusting element (4) that can be operated from outside, said adjusting element (4) being connected to the first or to the second friction element (31,32) for their relative axial displacement; and wherein the adjusting element is an adjusting nut (4D), whose internal thread engages into an external thread of the first friction element (31D) and acts upon the second friction element (32D) in an axial direction.

2. A rotational damper as set forth in claim 1, characterized in that the adjusting element is an adjusting shaft (4A . . . 4C) that is designed at least at one of its ends in such a way that it has an engagement opening (41A,41B) for a frictional engagement of an adjusting tool, with which it can be turned or axially displaced.

3. A rotational damper as set forth in claim 2, characterized in that the stator (2B) provides a lid that covers the adjusting shaft (4B), and that the opposite end of the adjusting shaft (4B) has an engagement opening (41B) for an adjusting tool.

4. A rotational damper as set forth in claim 2, characterized in that the adjusting shaft (4A) is routed coaxially through the first friction element (31A) and the second friction element (32A).

5. A rotational damper as set forth in claim 2, characterized in that the adjusting shaft (4C) engages via an external thread into an internal thread of the first friction element (31C).

6. A rotational damper as set forth in claim 2, characterized in that the adjusting shaft (4A,4B) engages via an internal thread into an external thread of the second friction element (32A,32B).

7. A rotational damper as set forth in claim 1, characterized in that the second friction element (32) has at least one segment (5) that extends, at a depth (X) that can be varied by means of the adjusting element (4), into the volume with the viscous fluid and that also brings about the rotational coupling of the two friction elements (31,32).

8. A rotational damper as set forth in claim 7, characterized in that the flow resistance of the at least one segment (5F) is dependent upon the direction of rotation of the rotor.

9. A rotational damper as set forth in claim 1, characterized in that the second friction element (32) has at least one segment (5) that extends, at a depth (X) that can be varied by means of the adjusting element (4), into the volume with the viscous fluid and that also brings about the rotational coupling of the two friction elements (31,32), and further characterized in that the first friction element (31) is a cylindrical member whose end face is cut in to at least the depth (X), so as to be complementary to the cross section of the at least one segment (5), wherein a clearance remains for the viscous fluid to pass through during the axial displacement of the two friction elements (31,32).

10. A rotational damper as set forth in claim 1, characterized in that the outer wall of the first friction element (31) slides on the inside of the stator.

11. A rotational damper as set forth in claim 1, characterized in that the rotor has a toothed wheel (6) that meshes with a toothed rack (7).

12. A rotational damper comprising a stator (1,2) and a rotor that is rotatably supported in the stator, the rotor having a first friction element (31), wherein the volume between the stator (1A,2A) and the rotor is filled with a viscous fluid, characterized in that the rotor has a second friction element (32) that is supported coaxially in relation to the first friction element (31) and rotationally coupled thereto, and that can be axially displaced relative to the first friction element, wherein said damper further comprises an adjusting element (4) that can be operated from outside, said adjusting element (4) being connected to the first or to the second friction element (31,32) for their relative axial displacement; wherein the adjusting element is an adjusting shaft (4A . . . 4C) that is designed at least at one of its ends in such a way that it has an engagement opening (41A,41B) for a frictional engagement of an adjusting tool, with which the adjusting shaft can be turned or axially displaced; and wherein the adjusting shaft (4G) has a peripheral shoulder on which a wedge-shaped adjusting tool (8) can engage.

13. A rotational damper comprising a stator (1,2) and a rotor that is rotatably supported in the stator, the rotor having a first friction element (31), wherein the volume between the stator (1A,2A) and the rotor is filled with a viscous fluid, characterized in that the rotor has a second friction element (32) that is supported coaxially in relation to the first friction element (31) and rotationally coupled thereto, and that can be axially displaced relative to the first friction element; wherein said damper further comprises an adjusting element (4) that can be operated from outside, said adjusting element (4) being connected to the first or to the second friction element (31,32) for their relative axial displacement; wherein the second friction element (32) has at least one segment (5) that extends, at a depth (X) that can be varied by means of the adjusting element (4), into the volume with the viscous fluid and that also brings about the rotational coupling of the two friction elements (31,32); and wherein the segments (5) form a toothed wheel.

* * * * *